United States Patent

[11] 3,546,363

[72] Inventors Michael J. Pryor
Woodbridge;
Damian V. Gullotti, West Haven, Conn.
[21] Appl. No. 641,228
[22] Filed May 25, 1967
Continuation-in-part of Ser. No. 608,617,
Jan. 11, 1967, abandoned.
[45] Patented Dec. 8, 1970
[73] Assignee Olin Corporation
a corporation of Virginia

[54] COMPOSITE GLASS-TO-METAL SEAL
33 Claims, 2 Drawing Figs.
[52] U.S. Cl. .................................................. 174/52,
75/153, 174/50.56
[51] Int. Cl. .................................................. H01j 5/46,
H05k 5/06
[50] Field of Search ........................................ 174/50.5,
50.6, 50.63, 50.61, 52.5; 317/234, 14; 29/62, 44,
628, 193, 193.5; 75/153, 160

[56] References Cited
UNITED STATES PATENTS
| | | | |
|---|---|---|---|
| 2,130,737 | 9/1938 | Hensel et al. ................. | 75/160 |
| 2,142,672 | 1/1939 | Hensel et al. ................. | 75/160 |
| 3,107,998 | 10/1963 | Saarivirta .................... | 75/153 |
| 3,330,653 | 7/1967 | Paces et al. .................. | 75/153 |
| 3,351,700 | 11/1967 | Savolainen et al. ........... | 174/50.56 |

*Primary Examiner*— Darrell L. Clay
*Attorneys*— Robert H. Bachman, Arthur N. Krein, Richard S. Strickler and George J. Koeser ABSTRACT: A composite metal product, and glass or ceramic to metal seals using the composite, wherein the composite has the properties of a low coefficient of expansion, approximating that of the glass or ceramic, good thermal conductivity, and fine grain size in the annealed condition. This is achieved by cladding an alloy having a low coefficient of expansion on either side of a copper alloy core having thermal conductivity of at least 90 B.t.u./sq. ft./ft./hr./° F. The copper alloy contains at least one metal selected from the group consisting of iron, cobalt, zirconium and chromium and has a grain size of no more than .05 milimeters after annealing of the composite. The copper alloy core also may contain a deoxidizer selected from the group consisting of phorsphorus, boron, and silicon, which also improves its thermal conductivity. The high thermal conductivity is developed by any of a number of different heat treatments. The heat treatments generally involve annealing, with fast or slow, heat up and cool down, and preferably an additional thermal treatment at a temperature lower than the annealing temperature.

INVENTORS
MICHAEL J. PRYOR
DAMIAN V. GULLOTTI

COMPOSITE GLASS-TO-METAL SEAL

This application is a continuation-in-part of application Ser. No. 608,617, filed Jan. 11, 1967, now abandoned.

This invention relates to a method for producing a composite metal product for use as a seal to glasses and ceramics which has the properties of a low coefficient of expansion, approximating that of the appropriate glasses and ceramics, good thermal conductivity, and fine grain size in the annealed condition. This is achieved by processing a composite consisting essentially of a cladding of an alloy having a low coefficient of expansion on either side of a copper alloy core. The copper alloy contains at least one metal selected from the group consisting of iron, cobalt, zirconium and chromium, and is processed so as to have a grain size of not more than .05 mm. and a thermal conductivity of at least 90 B.t.u./sq. ft./ft./hr./° F. after annealing of the composite.

Iron-nickel and iron-nickel-cobalt alloys with low coefficients of thermal expansion are used for making hermetic seals of metal-to-glass and metal-to-ceramics. These products, however, are improved by providing a core of a material of good thermal conductivity to aid in heat dissipation during sealing of the metal to the glass or ceramic. The improved heat rejection during the glass-to-metal sealing operation greatly enhances production rates and also gives longer life under conditions of fluctuating service temperatures. Thus, composites made of oxygen-free copper, clad on either side with an alloy of 17 percent cobalt and 25 percent nickel, the balance iron, already have been proposed for such seals. However, the complicated shapes of which these seals are made require processing of the composite in the annealed condition. The annealing operation must not only soften the copper alloy core, but must also soften the claddings which characteristically have annealing temperatures very much higher than those of copper core alloys. Thus iron-nickel and/or cobalt alloys used for the claddings are annealed at from 1,600° F. to 1,950° F. as compared with an annealing temperature of around 400° F. for copper. This high annealing temperature results in secondary grain growth of copper and therefore in giant grain size (mm. or higher). When cups or other complex shapes are formed of such composites, the core of which has such giant grains, there is formed a large amount of coarse "orange peel," which is undesirable because of the poor dimensional tolerances which are obtained at the "orange peel" sections.

It is an object of this invention to provide a process for obtaining a composite product, the clad of which has a low coefficient of expansion, approximating that of glasses and ceramics.

It is another object of the present invention to provide a method for obtaining a composite product having good thermal conductivity.

It is another object of this invention to provide a composite product which has an inherently fine grain size and therefore avoids the formation of "orange peel" after forming operations.

It is another object of this invention to provide a heat treating process which will result in an annealed composite product which has god dimensional tolerances after forming into a complex shape.

It is another object of this invention to provide a heat treating process for obtaining a composite product which contains a copper alloy core having a grain size not greater than .050 mm. and a thermal conductivity of at least 90 B.T.U./sq. ft./ft./hr./° F. when the composite is in the annealed condition.

Other objects of this invention will be apparent from the following disclosure.

The starting material for the process of the present invention is a composite containing a low expansion alloy clad on either side of a core of a copper alloy containing a low expansion alloy at least one alloying element selected from the group consisting of iron, cobalt, zirconium and chromium. The copper core alloy, in addition to containing at least one member selected from the group of iron, cobalt, zirconium and chromium, preferably also has at least one deoxidizing element selected from the group consisting of phosphorus, boron and silicon.

The copper base core alloys may contain from approximately 0.5—5.0 weight percent of iron; from 0.1—1.0 percent chromium; from 0.05—2.5 percent zirconium and from 0.5—7 percent cobalt or combinations of the foregoing in the total weight percent not to exceed 10.0, with or without deoxidizing agents selected from the group consisting of phosphorus in the amounts of 0.001—0.3 percent; silicon, 0.02—0.25 percent; boron, 0.001—0.15 percent or combinations of these in the total amount not to exceed 0.5 weight percent.

The thermal conductivity of the copper alloy core is also very important. The thermal conductivity of the copper core after processing must not be less than 90 B.t.u./sq. ft./ft./hr.° F. This is achieved partly because of the use of copper alloys containing at least one metal selected from the group of iron, cobalt, zirconium and chromium and is also obtained with, in addition to these elements, a deoxidizer selected from the group consisting of phosphorus, boron and silicon. A deoxidizer need not be present in order to obtain the necessary value of 90 B.t.u./sq. ft./ft./hr./° F., but those selected from the above group will be helpful in improving the thermal conductivity of the copper core alloy from about 10 to 50 B.t.u./sq. ft./ft./hr./° F. The preferred thermal conductivity of the copper alloy core is at least 112 B.t.u./sq. ft./ft./hr./° F.

Alloys to be used for cladding both sides of the copper core are iron containing alloys having a coefficient of expansion of near equal to or near that of the glass or ceramic into which the composite is to be sealed. Thus, in general, alloys having a coefficient of expansion in the range of 1 to 300 × 10⁻⁷ in./in./° F. may be utilized.

Exemplary alloys which may be used for the clad together with their chemical composition in percent by weight and their coefficient of thermal expansion are shown in the following table. However, it is to be understood that the alloys in the table are given by way of example only and that the invention is not to be construed as limited to the particular alloys given in the table.

TABLE 1

| Alloy | Nominal composition, wt. percent | Coefficient of thermal expansion (in./in./°F.×10⁻⁷) |
|---|---|---|
| Super Invar | 64 Fe, 31 Ni, 5 Co | 2.5 |
| Invar (Nilvar) | 64 Fe, 36 Ni | 4.5 |
| Elinvar | 53–61 Fe, 33–35 Ni, 4–5 Cr, 1–3 W, 5–2 Mr, 5–2 Si and 5–2 C. | 30–50 |
| Platinite | 54 Fe, 46 Ni | 41 |
| Rodar (Fernico) | 54 Fe, 29 Ni, 17 Co | 41 |
| Elgiloy (Octanium) | 40 Co, 20 Cr, 15 Ni, 15 Fe, 7 Mo, 2 Mn, 0.15 C, .3 Be and 0.5 incidental impurities. | 71 |

The processing of the composite may be as follows. The clad alloy is metallurgically bonded to both sides of the core. The bonding may be carried out, for example, by following the teachings of Winter, U.S. Pat application Ser. No. 229,262, filed Nov. 2, 1962, now abandoned or by following Rader-Goldman-Winter, application Ser. No. 549,319, filed May 11, 1966, now U.S. Pat. No. 3,470,607, both assigned to the same assignee as the present invention, or according to any other method of forming a sound metallurgical bond between the core and the clad.

The method of forming a clad is not critical so long as a strong metallurgical bond required for good heat transfer is obtained between both sides of the clad to the copper core. However, the preferred cladding method is described in Rader-Goldman-Winter, U.S. Pat. application Ser. No. 549,319, filed May 11, 1966.

In general, the process comprises: (A) providing said core in plate form in a thickness less than one-half inch; (B) providing said cladding in plate form in a thickness less than one-quarter inch; (C) rolling together said core and cladding to form a green bond; and (D) cold rolling the resultant poorly bonded composite at least 5 percent in excess of that required to achieve maximum hardness of the core. The higher the first step reduction, the lower the required second step reduction, although increase in the second step reduction continues to give a bond strength improvement with the mill equipment being a limiting feature.

In the case of composites with a copper alloy core, the green bond is formed with a rolling reduction of from 60 to 78 percent, with the subsequent cold rolling reduction being at least an additional 18 percent to give a total reduction of at least 75 percent.

The clad may make up not more than 33⅓ percent on a side of the composite. In other words, the total cladding, considering both sides, must not be more than approximately 67 percent of the composite.

After forming the composite, the composite may be cold rolled to final gage, if the composite is not at final s gage after the cladding operation, and then annealed in a nonoxidizing atmosphere. The nonoxidizing atmosphere may be provided by annealing in a vacuum, annealing in an inert gas, or preferably the annealing may be done in an atmosphere of disassociated ammonia which may contain, for example, 25 percent nitrogen—75 percent hydrogen or as another example, 90 percent nitrogen—10 percent hydrogen.

1. The temperature to be used for the anneal may be as low as 1,200° F., or as high as 1,950° F., but it is preferably carried out at a temperature of from 1,550° to 1,750° F. The time period can be as low as 1 minute at temperatures near 1,800° F., but longer times (from 15 minutes to 24 hours) are required at lower temperatures (near 1,300° F.) within the range of 1,200° to 1,550° F.

2. In one embodiment, the annealing may take place by a slow heatup and cooldown with a total of 45 minutes to 1½ hours above 1,400° F. with a 15-minute soak at 1,450° to 1,700° F., also yielding a grain size which is acceptable for the glass-to-metal seal.

3. If the annealing is practiced according to the conditions described in either of the preceding paragraphs (1 and 2), the composite must be slow cooled to room temperature at a cooling rate not greater than 400° F. per hour in order to achieve the necessary thermal conductivity (90 B.t.u./sq. ft./ft./hr./° F.).

4. In another embodiment of the invention involving rapid heatup and rapid cooldown rates (each less than 90 seconds) and 10 to 15 minutes at temperature, temperatures within the range of 1,550° to 1,750° F. result in core grain sizes below the 0.05 mm. maximum.

5. A preferred embodiment of the invention involves strip annealing the composite at a temperature of from 1,650° to 1,750° F. for a period of time from 1 minute to about 2 minutes, with rapid heating and rapid cooling, for example, both the heating and the cooling being accomplished within a period of 90 seconds. This treatment has the advantage of a very short time in the furnace and results in a grain size below the .05 mm. maximum.

6. However, if the annealing is carried out according to the conditions specified in either of the last preceding paragraphs (4 and 5), there must be an additional thermal treatment involving heating from approximately 600° to 1100° F. for a period of time from 15 minutes to 24 hours to increase the termal conductivity of the core up to the necessary minimum of 90 B.t.u./sq. ft./ft./hr./° F. A treatment of from 1 to 8 hours at approximately 750° to 1,000° F. is preferred.

7. Furthermore, reheating to a temperature within the range of 8 600° to 1,100° F. is desirable even if the annealing is carried out according to preceding paragraphs 1 through 3 because an increase in thermal conductivity is observed from approximately 7 to 13 percent, depending upon the particular previous cooling rate from the annealing temperature.

8. In still another embodiment of the invention, the composite may be rapidly heated to a temperature from 1,700° to 1,750° F. and a soaked for 1 to 2 minutes and then cooled to 800° to 1,000° F. over a time period of from approximately 20 to 40 minutes. The composite is then held in this temperature range, preferably in a nonoxidizing atmosphere, from 15 minutes to 12 hours and cooled to room temperature. This treatment results in thermal conductivity of the copper core alloy of at least 95 B.t.u./sq. ft./ft./hr./° F.

In addition to having the necessary thermal conductivity, composites which have been given the previously described thermal treatments (1—8) will have a grain size of not more than 0.05 mm. This small grain size avoids the appearance of "orange peel" and the poor dimensional tolerances observed in prior composites.

An example of the method of producing the glass-to-metal seal according to the present invention follows. However, it is to be understood that structural presentations are only exemplary and that many other entirely different structural configurations may be devised.

Figure 1:
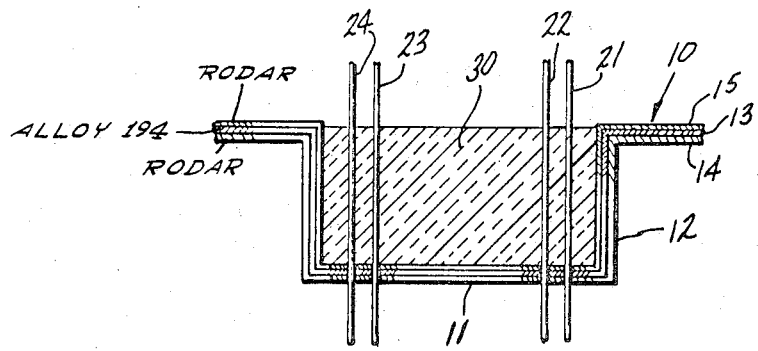
FIG. 1 is a sectional view of a first assembly stage of fabrication.

As can be seen from FIG. 1, the composite 10 made of a copper alloy core 13 clad and bonded on both sides at 14 and 15 as previously described, is heat treated as described hereinbefore, and is then formed, for example by drawing, into a cup-shaped header as shown at 10 having a circular portion 12 and a base portion 11. The header can be accurately dimensioned due to the fine grain size of the copper alloy core. Wires 21, 22, 23 and 24 made of electrically conductive material such as Ni or Rodar pass through openings in the base part 11 of the composite header. After these wires are placed in position, a glass or ceramic in the molten state is poured into the header. It is then allowed to solidify at 30. The particular glass will vary according to the particular application, however it will in general contain a large portion of silica.

Figure 2:
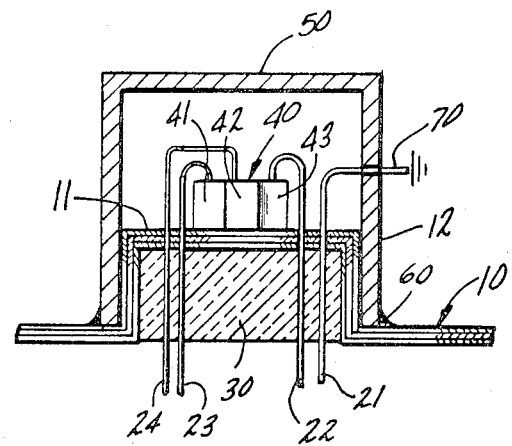
FIG. 2 is a sectional view of a completed composite assembly seal.

As shown in FIG. 2, the thus formed article is inverted and a semiconductor or transistor 40, which may be made, for example, of silicon or germanium, having an emitter 41, a base 42, and a collector 43 is then placed upon and conventionally affixed to the composite base portion 11. Three of the leads 23, 24 and 22 are connected to the respective base, emitter and collector portions.

A metal cap 50 is then snuggly fit around the circular portion 12 of the composite, and is resistance-welded at 60 to the composite. The cap 50 may be made of any appropriate metal or alloy, for instance, of nickel, of Rodar alloy (see table I), or a copper-steel composite.

The remaining wire may be grounded either to the metal cap, or to a connection passing through the cap, appropriately hermetically sealed.

It is thus seen that the process of the present invention results in an effective glass-to-metal seal. It has a coefficient of expansion approximating that of the glass or ceramic 30. It has high thermal conductivity for heat rejection. It effectively seals the interior of the structure shown in FIG. 2 from the atmosphere to prevent leakage of the interior of the structure to the exterior in service, such as at high altitude where the atmospheric pressure is lower than sea level.

The following examples are submitted for illustrative purposes, but are not to be construed as limiting the invention except as set forth in the claims which follow.

EXAMPLE I

A metallurgically bonded composite was prepared with .003 inch of an alloy containing 29 percent Ni, 17 percent Co, balance essentially iron clad on both sides of .009 inch of oxygen-free high-conductivity copper. The composite was annealed at 1,750° F. for 1 hour and cooled to room temperature at a rate of 50° F./hr. The thermal conductivity of the OFHC copper core was 246 B.t.u./sq. ft./ft./hr./° F. The average grain size of the OFHC core was approximately 1 mm. in diameter. On forming the composite strip into a cup, it showed severe "orange peel" and poor dimensional tolerance.

EXAMPLE II

A composite was made by following the teachings of U.S. Pat. application Ser. No. 549,319 comprising .003 inches of an alloy containing 29 percent Ni, 17 percent Co, balance essentially iron clad on both sides of .009 inches thickness of a copper alloy containing 2.3 percent iron, balance essentially copper. The composite was heated for 1 hour at 1,750° F. to ensure full softening of the core and cladding and cooled to room temperature at a rate of 50° F./hr. The thermal conductivity of the copper alloy core was 92 B.t.u./sq. ft./ft./hr./° F. and its grain size of an average of .035 mm. The composite was formed into a cup with good dimensional tolerance and without any evidence of "orange peel" "orange peel". Furthermore, the conductivity was sufficiently high to ensure good heat rejection in a glass-to-metal sealing operation.

EXAMPLE III

A composite was made by following the teachings of U.S. Pat. application ser. No. 549,319 comprising .003 inch of an alloy containing 29 percent Ni, 17 percent Co, balance essentially iron clad on both sides of .009 inch thickness of a copper alloy containing 2.3 percent iron and .03 percent phosphorus, balance essentially cope copper. The composite was heated for 1 hour at 1,750° F. to ensure full softening of the core and cladding and cooled to room temperature at a rate of 50° F./hr. The thermal conductivity of the copper alloy core was 112 B.t.u./sq. ft./ft./hr./° F. and its grain size of an average of .035 mm. The composite was formed into a cup with good dimensional tolerance and without any evidence of "orange peel". Furthermore, the conductivity was sufficiently high to ensure good heat rejection in a glass-to-metal sealing operation.

EXAMPLE IV

A composite was made by following the teachings of U.S. Pat. application Ser. No. 549,319 comprising .003 inch of alloy containing 29 percent Ni, 17 percent Co, balance essentially iron clad on both sides of .009 inch thickness of a copper alloy containing 0.9 percent chromium, 0.2 percent phosphorus, balance essentially copper. The composite was heated for 1 hour at 1,750° F. to ensure full softening of the core and cladding and cooled to room temperature at a rate of 50° F./hr. The thermal conductivity of the copper alloy core was 168 B.t.u./sq. ft./ft./hr./° F. and its grain size of an average of .035 mm. The composite was formed into a cup with good dimensional tolerance and without any evidence of "orange peel". Furthermore, the conductivity was sufficiently high to ensure good heat rejection in a glass-to-metal seal.

EXAMPLE V

A composite was made by following the teachings of U.S. Pat. application Ser. No. 549,319 comprising .003 inch of an alloy containing 29 percent Ni, 17 percent Co, balance essentially iron clad on both sides of .009 inch thickness of a copper alloy containing 0.9 percent chromium, 0.1 percent phosphorus, 0.02 percent boron. The composite was heated for 1 hour at 1,750° F. to ensure full softening of the core and cladding and quenched to room temperature in still water. The thermal conductivity of the copper alloy core was 116 B.t.u./sq. ft./ft./hr./° F., and its grain size of an average of .045 mm. The composite was formed into a cup with good dimensional tolerance without any evidence of "orange peel". Furthermore, the conductivity was sufficiently high to ensure good heat rejection in a glass-to-metal seal.

EXAMPLE VI

Coils of Rodar and alloy 194 were cleaned, brushed, rinsed and dried prior to Posit-Bonding*. The characteristics of the starting material used were as follows:

TABLE I.—STARTING MATERIAL

| Alloy | Composition | Gage | Width, inches | Temper | Y.S. (0.2%), p.s.i. | U.T.S. | Elong., percent |
|---|---|---|---|---|---|---|---|
| Rodar | Fe, 29% Ni, 17% Co, 0.3% Mn, 0.2% Si, 0.02% C | 0.020 | 4 | F.A. | 50,000 | 75,000 | 30 |
| Alloy 194 | Cu, 2.5%, Fe, 0.02% P | 0.100 | 4 | F.A. | 35,000 | 50,000 | 30 |

NOTE: The alloy 194 material was cold reduced to 0.060 before bonding. The physical properties before bonding were Y.S.=58,000, U.T.S.=64,000, elong.=9%.

A bonding reduction of 65% was used with the other bonding conditions being as given in Table II.

TABLE II

Coil Bonding Conditions

Core temperature: ambient
Percent reduction: 65±3%.
Entrance gages: Rodar—0.020" both sides of alloy 194—0.060".
Exist gage: 0.032–0.038".
Mill parameters:
    Speed: 30–50 f.p.m.
    Clad entrance angles: 6° above and below horizontal pass line.
    Separating force: 172,000–196,000 lb. (Percent load: 15–17).
    Mill volts: 80–120.
    Mill amps: 250.
    Forward tension: 1000 lbs.
    Back tension core: 8000–12,000 lbs.
    Back tension clad: 2400–3000 lbs.
    Coil exist temperature: 252° F. (decreased to 217° F. in 30 minutes).
    The bonded material was cold rolled to finished gauge.

The so-treated product was then strip annealed in a horizontal furnace at 1,730° F. in a cracked ammonia (25 percent nitrogen — 75 percent hydrogen) atmosphere. Four coils traveled through a 10-foot long hot zone in parallel at a rate of 5 feet/minute and were air quenched on the exit side of the furnace. The resulting properties were as follows:

Composite yield strength (0.2%)—29–31,000 p.s.i.
Tensile strength—51–55,000 p.s.i.
Elongation—29–31%.
Alloy 194 grain size—0.025 mm.
Rodar grain size—.010 mm.
Thermal conductivity of the core—79 b.t.u./sq. ft./ft./hr./° F.

The composite was then annealed at a temperature of 900° F. for four hours in an argon atmosphere. The properties after this anneal were:

0.2% yield strength = 30,000 p.s.i.
Tensile strength = 58,000 p.s.i.
Elongation = 29%.
Resulting core conductivity = 133 b.t.u./sq. ft./ft./hr./°F.

EXAMPLE VII

A composite treated as in example VI up to the annealing step was inserted into a furnace in an argon atmosphere at 1,730° F. and soaked for 90 seconds. The furnace was then turned off and the sample cooled at 900° F. for 30 minutes. After a 4- hour soak, the sample was cooled to room temperature. The resulting conductivity of the core was 125 B.t.u./sq. ft./ft./hr./° F. The mechanical properties were essentially identical to those obtained in example VI.

It is to be understood that the invention is not limited to the illustrations described and shown herein, which are deemed to be merely illustrative of the best modes of carrying out the invention, and which are susceptible of modifications of form, size, arrangement of parts and detail of operation. The invention rather is intended to encompass all such modifications which are within the spirit and scope of the invention.

We claim:

1. A process for preparing a composite glass or ceramic-to-metal seal comprising a copper alloy core having a grain size not greater than .050 mm. and a thermal conductivity of at least 90 B.t.u./sq. ft./ft./hr./° F., and a clad having a coefficient of expansion approximating that of said glass or ceramic, the process comprising: bonding a copper alloy core containing at least one alloying element selected from the group consisting of iron, cobalt, zirconium and chromium to a cladding alloy, heating the resulting composite in a nonoxidizing atmosphere at a temperature of from 1,200° to 1,950° F. for a period of time of from 1 minute to 2 hours, and cooling the composite to room temperature at a cooling rate not greater than 400° F. per hour.

2. A process according to claim 1 in which the composite is slowly heated up to a temperature above 1,400° F. and held there for a period of time of approximately 45 minutes to 1½ hours.

3. A process according to claim 1 in which after slow cooling, the composite is reheated to a temperature of from approximately 600° to 1,100° F. for a period of time of from 15 minutes to 24 hours.

4. A process according to claim 3 in which the heating is done at approximately 750° to 1,000° F. for a period of time from 1 to 8 hours.

5. A process according to claim 1 in which the cooling to room temperature is interrupted at a temperature of from 800° to 1,000° F. and the composite is held within this temperature range for 15 minutes to 12 hours and then cooled to room temperature.

6. A process according to claim 1 in which the copper alloy core contains a deoxidizer selected from the group consisting of phosphorus, boron and silicon which, in addition, also improves conductivity.

7. A process according to claim 6 in which the grain size of the copper alloy is not greater than 0.50 mm., and the thermal conductivity is at least 112 B.t.u./sq. ft./ft./hr./° F.

8. A process according to claim 1 in which after cooling, the composite is formed into a header by drawing and very accurate dimensions are obtained during the drawing operation.

9. A process according to claim 1 in which at least one opening is made in the drawn header, at least one wire is placed through the opening, a molten glass is poured into the cup around said wire, the glass is allowed to solidify, the resulting composite is inverted, a semiconductor device is placed upon the cup, and the said wire is connected to the semiconductor.

10. A process for preparing a composite glass or ceramic-to-metal seal comprising a copper alloy core having a grain size not greater than .050 mm. and a thermal conductivity of at least 90 B.t.u./sq. ft./ft./hr./° F., and a clad having a coefficient of expansion approximating that of said glass, or ceramic, the process comprising: bonding a copper alloy core containing at least one alloying element selected from the group consisting of iron, cobalt, zirconium and chromium to a cladding alloy, rapidly heating the resulting composite in a nonoxidizing atmosphere to a temperature of approximately 1,550° to 1,750° F. for approximately 1 to 15 minutes, rapidly cooling the composite to room temperature and reheating the composite at a temperature within the range of approximately 600° to 1,100° F. for a period of time from 15 minutes to 24 hours.

11. A process according to claim 10 in which the composite is rapidly heated in strip form to a temperature of from 1,650° to 1,750° F. for a period of time from about 1 minute to about 2 minutes, and rapidly cooled to room temperature.

12. A process according to claim 10 in which the composite is rapidly heated to a temperature of from 1,550° to 1,750° F. and held there for a period of time from approximately 10 to 15 minutes and is then rapidly cooled to room temperature.

13. A process according to claim 10 in which the reheating is done at a temperature of from 750° to 1,000° F. for a period of time of from approximately 1 to 8 hours.

14. An annealed composite adapted to be used in a glass or ceramic-to-metal seal, between said composite and a substance selected from the group consisting of glasses and ceramics, said composite comprising: a copper alloy core containing at least one alloying element selected from the group consisting of iron, cobalt, zirconium and chromium, having a grain size not greater than .050 mm. and a thermal conductivity of at least 90 B.t.u./sq. ft. ft./hr./° F., metallurgically bonded on both sides of the core to a cladding alloy having a coefficient of expansion substantially equal to the glass or ceramic with which the composite is to be used.

15. A composite according to claim 14 in which the cladding alloy has a coefficient of thermal expansion of from 1 to 300 in./in./° F. × 10$^{-7}$.

16. A composite according to claim 14 in which the thermal conductivity of the copper alloy core is at least 112 B.t.u./sq. ft./ft./hr./° F.

17. A composite according to claim 14 in which the core also contains an alloying addition which improves thermal conductivity.

18. A composite according to claim 17 in which the addition is also a deoxidizer and is at least one selected from the group consisting of phosphorus, boron and silicon.

19. A composite according to claim 18 in which phosphorus is the deoxidizer and which the phosphorus content is from about 0.001 to 0.3 percent.

20. A composite according to claim 18 in which the deoxidizer is boron and in which the boron is present in an amount from 0.001 to 0.15 percent.

21. A composite according to claim 18 in which the deoxidizer is silicon in an amount from 0.02 to 0.25 percent.

22. A composite according to claim 18 in which the total amount of deoxidizer does not exceed 0.5 percent by weight.

23. A composite according to claim 14 in which the thickness of either side of the clad is not greater than 33⅓ percent of the entire composite.

24. A composite according to claim 14 in which the total amount of iron, chromium, zirconium and cobalt is not greater than 10 percent by weight of the copper core.

25. A composite according to claim 16 in which the copper base core alloy contains about 0.5 to 5.0 weight percent iron.

26. A composite according to claim 14 in which the copper base alloy core contains from about 0.1 to 1.0 percent chromium.

27. A composite according to claim 14 in which the copper base alloy core contains from about 0.05 to 2.5 percent zirconium.

28. A composite according to claim 14 in which the copper base alloy core contains from about 0.5 to 7 percent cobalt.

29. In a glass or ceramic-to-metal seal wherein the metal is a composite which forms a hermetic seal with the glass or ceramic, the improvement wherein the composite comprises: a copper alloy core containing at least one alloying element selected from the group consisting of iron, cobalt, zirconium, and chromium, having a grain size not greater than .050 mm. and a thermal conductivity of at least 90 B.t.u./sq. ft./ft./hr./° F. metallurgically bonded on both sides of the core to an annealed alloy having a coefficient of expansion substantially equal to the glass or ceramic of the glass or ceramic-to-metal seal.

30. A seal according to claim 29 in which the copper alloy core also contains an agent which also improves the thermal conductivity of the core.

31. A seal according to claim 30 in which the conductivity improving agent is also a deoxidizing agent and is at least one selected from the group consisting of silicon, boron, and phosphorus.

32. A glass or ceramic-to-metal seal assembly comprising: a cup shaped metal header having apertures therein for passage of electric conductors therethrough, said header and said conductors being adapted to form a seal with a glass or ceramic, said header being formed of a composite comprising:
a copper alloy core containing at least one alloying element selected from the group consisting of iron, cobalt, zirconium and chromium, having a grain size not greater than .050 mm. and a thermal conductivity of at least 90 B.t.u./sq. ft./ft./hr./° F. metallurgically bonded on both sides of the core to an annealed iron containing alloy having a coefficient of expansion substantially equal to said glass or ceramic;
electrical conductors having a coefficient of expansion substantially equal to said glass or ceramic being inserted through the apertures in said header; and
a mass of said glass or ceramic at least partially filling said cup and surrounding said conductors thereby sealing said conductors in place, said glass or ceramic being hermetically sealed to said header and said conductors.

33. An article according to claim 32 in which a semiconductor device is affixed to the inverted composite header containing said glass, and in which a cap engaging the walls of said composite cup is welded to the flange portion of said cup.